July 10, 1945.   A. A. KOTTMANN   2,379,911
ARTICLE HANDLING APPARATUS
Filed June 28, 1941   8 Sheets-Sheet 7

INVENTOR
Arthur A. Kottmann
BY Evans + McCoy
ATTORNEYS

July 10, 1945.  A. A. KOTTMANN  2,379,911
ARTICLE HANDLING APPARATUS
Filed June 28, 1941  8 Sheets—Sheet 8

INVENTOR
*Arthur A. Kottmann*
BY
*Evans + McCoy*
ATTORNEYS

Patented July 10, 1945

2,379,911

UNITED STATES PATENT OFFICE 2,379,911

ARTICLE HANDLING APPARATUS

Arthur A. Kottmann, Davenport, Iowa, assignor, by mesne assignments, to The Bettendorf Company, a corporation of Maryland Application June 28, 1941, Serial No. 400,269

17 Claims. (Cl. 146—88)

This invention relates to article handling apparatus, and more particularly to such apparatus for handling bread loaves to be fed into and through a slicing machine.

Slicing machines for bread loaves and the like have been perfected so that relatively high rates or speeds of slicing can be maintained and the slices produced are smooth and uniform and free from waves or similar defects and without crushing of the loaves. In coupling a slicing machine to a wrapping machine for operation as a unit, the loaf movement through the slicing machine must be synchronized with the loaf movement through the wrapping machine. Such an arrangement usually requires a positive feed for individually moving each loaf or article to and through the cutters of the slicing machine. However, operators of slicing and wrapping machines prefer to have the bread handling conveyors of the slicing machine so arranged that a number of loaves or articles can be deposited together "en masse" on the infeed of the slicing machine rather than to have the conveyors so arranged that the loaves or articles must be individually placed in the pockets or ahead of the flights of the infeed conveyor. Thus the preferable type of slicing machine infeed includes an escapement or shuttle combination which is arranged to separate the loaves deposited together on the infeed or loading conveyor, so that the loaves so separated are fed by positive acting means one at a time and in a definite predetermined relation to and through the cutters. Numerous devices are available for this purpose and the present invention has for one of its particular objects the improvement in shuttle or escapement construction for use between the loading or feed conveyor of the slicing machine and the conveyor or other instrumentality which individually feeds or forwards the loaves to and through the cutters. More specifically, the invention aims to provide in bread handling apparatus a combination of loading and forwarding conveyors, one or both of which may be inclined downwardly so that loaves or articles are moved thereover, at least in part, by gravity. The apparatus also includes a shuttle or carrier which is so arranged with respect to the loading and forwarding conveyors that the movement of a loaf or article onto the carrier from the loading conveyor, as well as the movement of an article or loaf off the carrier onto the forwarding conveyor, is effected, at least in part, by gravity.

Numerous improvements have been incorporated in the structure of the bread slicing machine illustrated in the drawings and embodying the present invention. Included in the improvements are means for adjusting the cyclic position of the shuttle or article shifting carrier with respect to the flights or other article pushing means of the forwarding conveyor, so that the release of articles from the carrier may be timed with respect to the cyclic movements of the pushers or flights of the forwarding conveyor; endless belt means for advancing articles over the loading conveyor and having a drive responsive to the cyclic movement of the carrier or shuttle so that the loading conveyor drive is arrested during each movement of the shuttle or carrier away from the loading conveyor; improved means for supporting guides of an adjustable width flight conveyor that receives sliced articles from the cutting mechanism, the guides being so arranged that they may be adjusted simultaneously and synchronously with the apron means of the discharge conveyor; and a casing for the operating parts of the apparatus so designed and arranged as to include an apron portion which is disposed in the path of articles moving beyond the discharge end of the loading conveyor, thereby serving as a stop for articles received on the shuttle or carrier.

A still further object of the invention is to provide generally improved bread handling apparatus for use in connection with slicing machines, which apparatus is relatively simple in design and construction and inexpensive to manufacture. Other objects and advantages of the invention relating to features of construction and arrangement of parts will become apparent from the following detailed description of suitable embodiments thereof made in connection with the accompanying drawings wherein like parts throughout the several views are indicated by the same numerals of reference.

Figure 1:
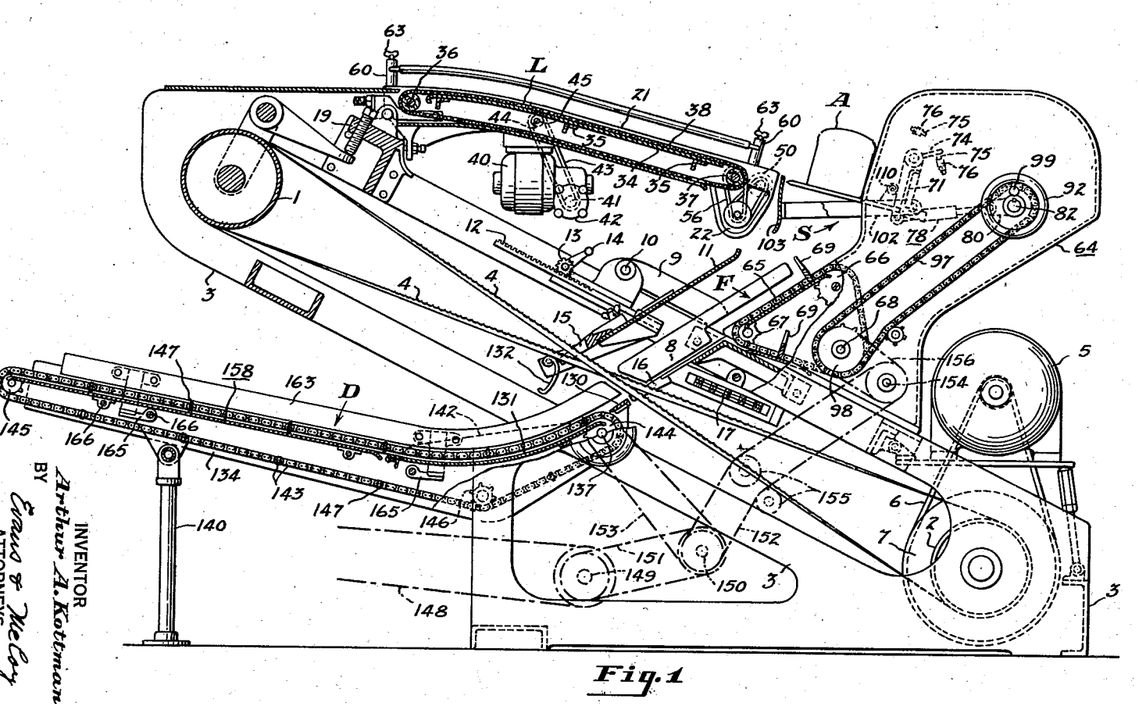
Figure 1 is a side elevational view, partly in section, with parts removed and somewhat diagrammatic, of a slicing machine of the endless band type having bread loaf handling apparatus embodying the present invention.

In the illustrated embodiment of the present invention a pair of drums 1 and 2 are mounted in spaced parallel relation to one another in a suitable supporting structure 3 and have a multiplicity of endless cutter bands 4 trained therearound in side by side crossed relation, all in accordance with well known practice (see co-pending application, Serial No. 260,046, filed March 6, 1939, now Patent No. 2,316,171, issued April 13, 1943).

An electric motor 5 mounted on the structure 3 and provided with suitable well known controls, is connected by a belt or chain 6 to a pulley 7 on the drum 2 for driving the latter and the cutters 4. Articles or loaves to be sliced by the bands 4 are placed in a group in side by side relation on a loading conveyor, indicated generally at L. Such loaves or articles are received one at a time by a shuttle or carrier, indicated generally at S, and transferred thereby to a forwarding conveyor F. As the loaves or articles are moved into the cutters 4 by the conveyor F, the ends of the articles are engaged by spaced parallel guides 8 carried by brackets 9 on a cross member 10. A suitable holddown plate or member 11, adjustable by means of rack 12 and pinion 13 having hand crank 14, is provided to engage the tops of the advancing articles. Slotted fingers or guides 15 carried by the supporting structure of the holddown 11 engage the individual runs of the cutters 4 above the slicing zone to space and guide the same. Similar guide fingers 16 engage the individual runs of the cutters 4 below the article path or slicing zone to space and guide the cutters. By means of a lazy tongs mechanism 17 the fingers 16 may be adjusted to vary the spacing between the cutters 4 upon removal of the guide fingers 15 from engagement with the cutter runs, this feature forming the subject matter of co-pending application, Serial No. 260,044, filed March 6, 1939, which became Patent No. 2,316,200 on April 13, 1943. Sliced loaves or articles released from the cutters 4 are received by a discharge conveyor D which advances the sliced loaves to a wrapping machine or instrumentality (not shown).

Figures 2, 3, 4:
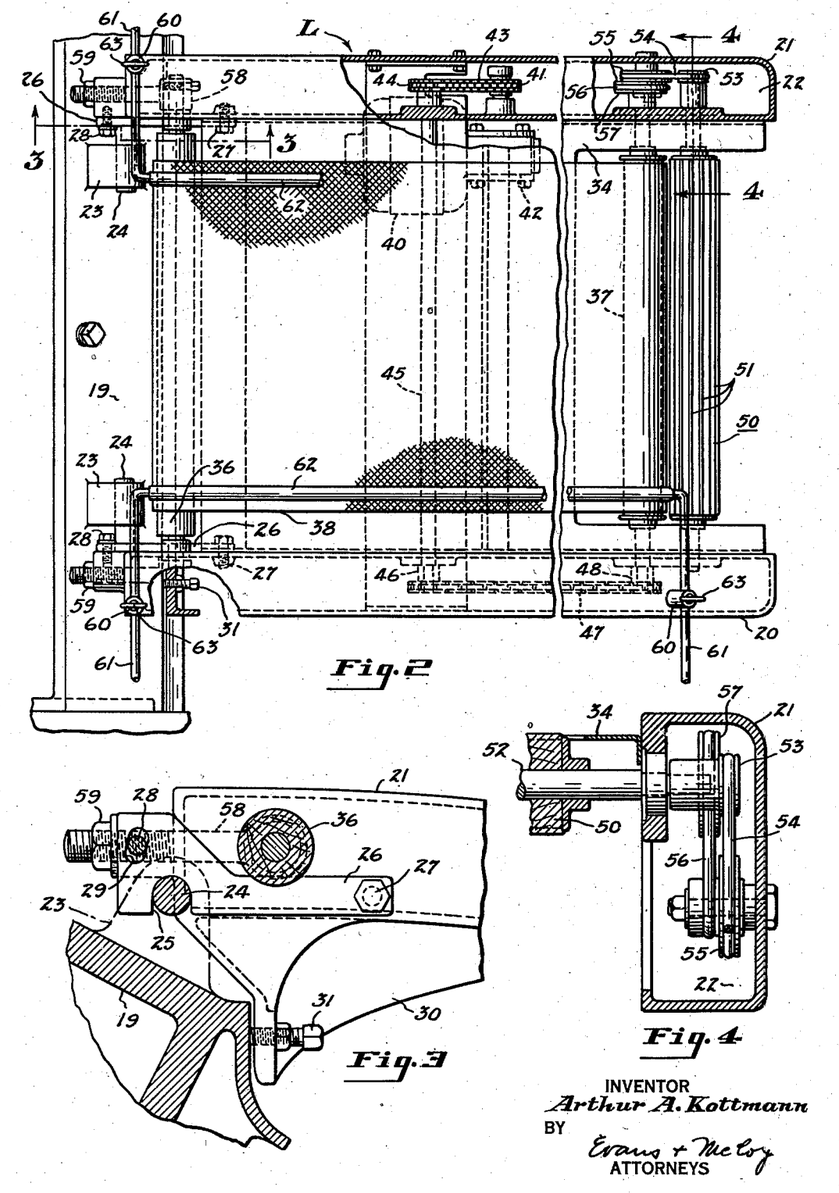
Fig. 2 is a foreshortened plan view, partly in section and with parts removed, showing the endless belt or loading conveyor of the machine illustrated in Fig. 1.
Fig. 3 is a sectional detail taken substantially on the line 3—3 of Fig. 2 and enlarged with respect thereto.
Fig. 4 is a sectional detail taken substantially on the line 4—4 of Fig. 2 and enlarged with respect thereto.

The loading or first infeed conveyor L comprises a pair of spaced parallel hollow support members 20 and 21 which may be suitably formed, as by casting, to provide substantially enclosed spaces 22 that house parts of the operating mechanism for the conveyor. At the top of the machine and extending between the side members of the supporting structure 3 is a cross member or transom 19, upon which are formed spaced lugs 23 that carry short axially aligned bars 24. These bars are received in downwardly opening slots or recesses 25 formed in hook elements 26 attached to the inside portions of the support members 20 and 21 by pivot bolts 27; thus by turning the elements 26 on the bolts 27 the upper or receiving end of the loading conveyor L may be raised or lowered as desired with respect to the supporting structure 3. Bolts 28 received in elongated slots 29 of the hook elements 26 and threaded into the support members 20 and 21 are provided to lock the hook elements 26 in adjusted positions. On the underside of the support members 20 and 21 are extensions 30 which threadedly receive adjusting bolts 31 that have bearing engagement with the cross or transom member 19 of the supporting structure 3 at portions thereof below the bars 24. In this manner the loading conveyor L is supported at one end only and extends from the top of the supporting structure 3 as a cantilever and at a downward inclination. By rotating the adjusting bolts 31 the loading conveyor may be made to turn as a unit on the short rods 24 to raise or lower the bottom or discharge end of the conveyor.

A supporting member or apron 34 is disposed between the members 20 and 21 and is mounted on cross members 35, the ends of which are secured to the support members 20 and 21. At the ends of the apron 34 are disposed elongated rollers 36 and 37 mounted on shafts journaled on or in the supporting members 20 and 21. Trained around the rollers 36 and 37 is an endless, flexible belt 38 or the like which may be in the form of a wire mesh strip having its ends suitably secured together. The upper lap of the belt 38 is supported on the apron 34 so that upon rotation of one of the rollers 36 or 37 the belt is made to travel over the apron and carry articles supported thereon downwardly over the conveyor. The roller 37 at the discharge end of the conveyor is driven as by means of an electric motor 40 suspended from the supporting member 21. This motor drives a pulley 41 of a speed reducer 42 which carries a belt 43 trained around a pulley 44 secured on one end of a transverse shaft 45 journaled in or on the supporting members 20 and 21. A sprocket or pulley 46 on the other end of the shaft 45 drives a belt or chain 47 trained around a pulley or sprocket 48 secured on the shaft of the roller 37.

At the discharge end of the loading conveyor L and beyond the path of the belt 38 is a booster or loaf accelerating roller 50 journaled on or in the support members 20 and 21 in parallel relation to the roller 37 which drives the endless belt 38. The booster roller 50 may be formed of a suitable material, such as wood, and is preferably roughened or of fluted construction providing longitudinally extending ribs 51 which engage and frictionally grip the bottoms of the loaves to resist slipping and sliding of the loaves on the roller. A shaft 52 on which the roller 50 is rigidly secured has a pulley 53 secured on one end thereof in the chamber 22 of the support member 21. A belt 54 connects the pulley 53 to the large diameter sheave of a double pulley 55 journaled on a stub shaft secured to the support member 21. The small diameter sheave of the pulley 55 receives a belt 56 that is trained over a relatively large diameter pulley 57 secured on the end of the shaft mounting the roller 37, the latter shaft being driven by the motor 40, as previously described.

By the train of belts 54 and 56 and the different diameter pulleys carrying the same, the corrugated or fluted booster roller 50 is made to rotate much faster than the roller 37 carrying the endless belt of the conveyor. For example, the surface or circumferential speed of the booster roller 50 may be two to four times as great as the surface speed of the endless belt 38. This arrangement promotes acceleration and a rapid transfer of the endmost article or loaf from the loading conveyor L onto the carrier, as will later appear, and also serves to move the endmost article sufficiently rapidly away from the other or succeeding articles on the loading conveyor to provide a space or separation between the endmost article received on the carrier and the next succeeding article on the loading conveyor. This space permits suitable stop means to be later described to move into position between the article on the carrier and the next article on the loading conveyor so that the stop engages the next article on the conveyor and holds the same at the end of the conveyor until the carrier is in position to receive the same during the next cycle of operation of the machine.

If desired, the roller 36 which carries the endless conveyor belt 38 at the upper or starting end of the loading conveyor may be journaled in elongated movable bar members 58 which have threaded portions extending through suitable openings in ends of the support members 20 and 21 and receive adjusting nuts 59, by means of which the roller 36 can be shifted laterally to regulate the tension on the belt 38 and to maintain parallelism between the rollers 36 and 37.

Adjacent the ends of each of the support members 20 and 21 and mounted thereon are upright stanchions or posts 60 which support parallel adjustable slide rods 61 mounting guides 62. These guides are disposed in spaced parallel relation above the loaf or article supporting surface of the endless belt 38 to engage the ends of articles placed on the loading conveyor and direct the movement of the loaves down the conveyor to the discharge end thereof. Wing bolts 63 threaded into the tops of the stanchions 60 are provided to tighten the slide rods 61 in adjusted position.

Mounted on the supporting structure 3 adjacent the discharge end of the loading conveyor is a supplemental frame or housing 64 which accommodates the shuttle S and the forwarding conveyor F and comprises spaced side members which may be formed of steel or iron castings connected by suitable cross members and aprons. The forwarding conveyor comprises spaced endless members or chains 65 disposed in general parallel relation to one another and trained around sprockets 66 and 67 for the upper laps or runs of the endless members and a pair of sprockets on driven shaft 68 which thereby actuate the endless members 65 in synchronism. The driven shaft 68 and the shafts for the sprockets 66 and 67 are journaled in the side frame members of the supplemental frame 64. A plurality of equally spaced flights 69 extend between and are pivotally connected at their ends to the endless members 65. Suitable tracks or guides for the flights are provided so that the flights travel in upright relation over a downwardly inclined loaf supporting apron 70 which is supported between the side members of the frame 64 and extends between the shafts for the sprockets 66 and 67.

As shown in Figure 1, the loading conveyor L is inclined downwardly toward its discharge end so that the movement of loaves or articles therefrom is effected or facilitated, in part at least, by gravity. The loading conveyor is also disposed above the forwarding conveyor F so that the general direction of movement of articles over the loading conveyor is opposite to the general direction of movement of articles over the forwarding conveyor. Furthermore, the forwarding conveyor is inclined downwardly from its receiving end so that the movement of the loaves or articles thereover and into the slicing mechanism is induced or facilitated, at least in part, by gravity. The lowermost or discharge end of the loading conveyor L is disposed above and in spaced relation to the upper or receiving end of the forwarding conveyor F, and transference of articles between the conveyors is effected by means of the shuttle S.

Figure 5:
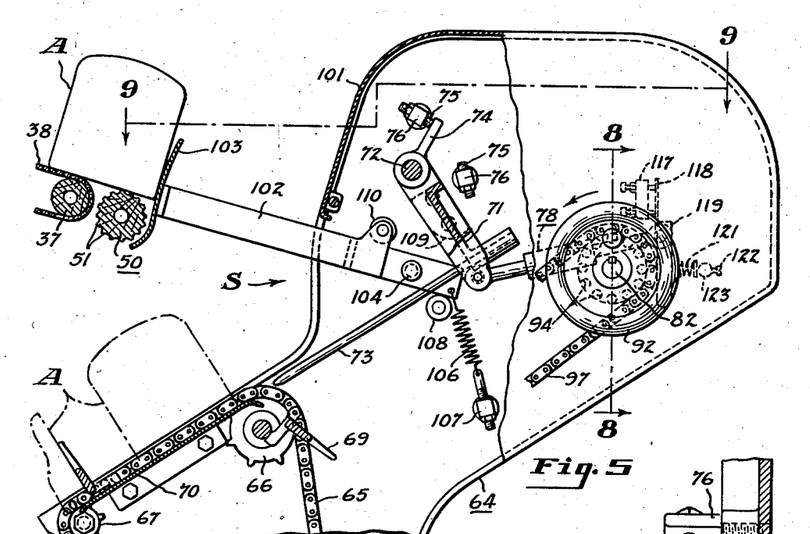
Fig. 5 is a fragmentary elevational view, partly in section and with parts broken away, showing the shuttle or carrier mechanism of Fig. 1 with with the carrier at its lower limit of movement, the illustration being enlarged with respect to Fig. 1.
Figure 6:
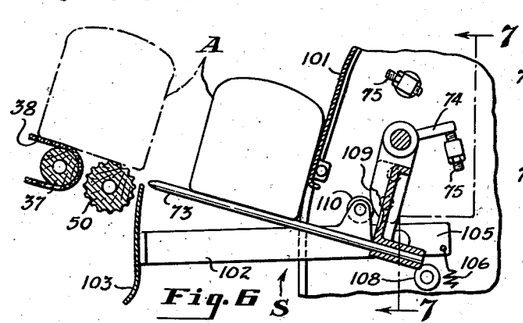
Fig. 6 is an elevational detail, partly in section and with parts removed, corresponding to Fig. 5 and showing the carrier or shuttle at its upper limit of movement.
Figure 7:
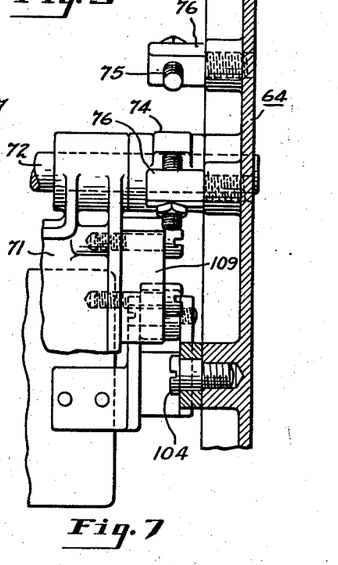
Fig. 7 is a vertical sectional detail taken substantially on the line 7—7 of Fig. 6 and enlarged with respect thereto.

In its preferred embodiment, the shuttle or carrier S comprises a member 71 mounted in depending relation to turn on a cross shaft or rod 72 extending between the side members of the supplemental frame 64. Thus, the carrier member 71 is mounted to swing or turn about the axis of the shaft 72, which is preferably parallel to the loaf or article supporting planes of the loading conveyor L and the forwarding conveyor F, and above such planes. The member 71 of the carrier may be conveniently made by casting and is suitably formed with a number of parallel openings or drill holes which receive elongated rods or loaf supporting elements 73. The rods 73 extend angularly from the member 71 and turn therewith about the axis of the shaft 72 and provide a tiltable gridlike planar loaf or article supporting platform which may be moved from a position in alignment with the forwarding conveyor, as shown in Fig. 5, to a position in alignment with the loading conveyor L, as shown in Fig. 6. To limit the turning movement of the shuttle or carrier S to the arc between the positions shown in Figs. 5 and 6, the member 71 is formed with a projecting ear 74 which swings through an arc and engages adjusting or stop screws 75 threaded through members 76 extending inwardly from one of the side members of the supplemental frame 64. By screwing the bolts 75 into or out of the members 76, the limits of movement of the carrier or shuttle may be adjusted to accurately align the bars 73 with the loaf supporting planes of the loading and forwarding conveyors.

To actuate the shuttle or carrier for reciprocation or oscillation between the discharge station of the loading conveyor and the receiving station of the forwarding conveyor, a link 78 is pivotally connected to the member 71 at 79 and to a crank 80 by a pin or bolt 81. The crank 80 is keyed to a short shaft journaled in one of the side members of the supplemental frame 64. The shaft 82 is rotated continuously so that the throw of the crank 80 acting through the link 78 oscillates the shuttle or carrier S on the rod 72.

Figures 9, 10, 11:
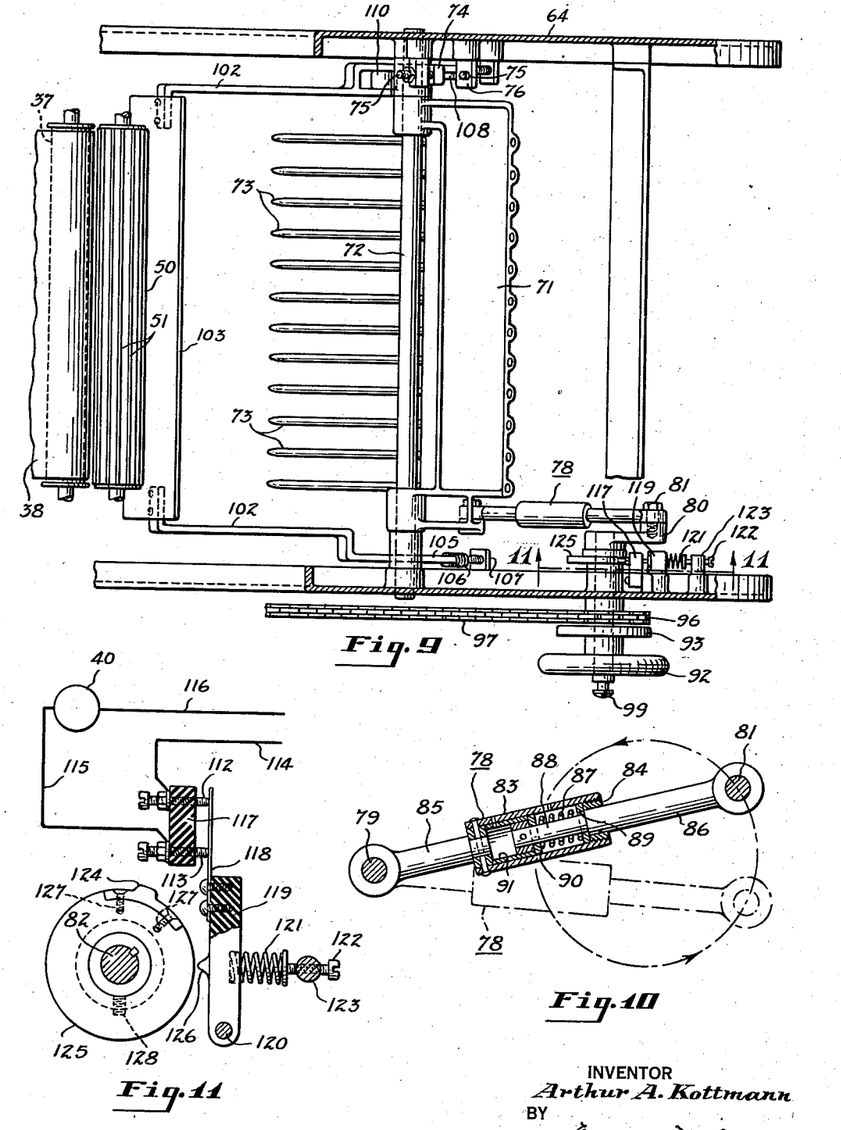
Fig. 9 is a horizontal sectional view, with parts removed and with parts broken away, taken substantially on the line 9—9 of Fig. 5 to show the shuttle or carrier.
Fig. 10 is a sectional detail showing the construction of the resilient lost motion link for operating the shuttle or carrier.
Fig. 11 is a sectional detail, with parts removed and with parts broken away, showing the control switch mechanism for governing the loading conveyor drive means. This view is taken substantially on the line 11—11 of Fig. 9, being enlarged with respect thereto, and also shows in diagrammatic form the electrical connections between the switch control, the power source and the loading conveyor drive motor.

The throw of the crank 80 is sufficient to move the carrier or shuttle over an arc greater than that permitted by the stop bolts or screws 75, and to provide for this movement of the crank the link 78 is longitudinally expansible and contractible. One portion 85 of the link 78 is formed with or carries an axial sleeve 83 provided with a journal or bearing 84 which slidingly receives the other portion 86 of the link. Within the sleeve 83 is a helical compression spring 87 disposed about a reduced diameter end 88 on the link portion 86 and confined between limit washers 89 and 90. The normal positions of the parts of the link 78 are shown in Fig. 10. During the rotation of the crank 80 the pin 81 thereof moves in a clockwise direction in a path indicated by the broken line circle, and during the movement of the crank pin carrying the link 78 from the broken line position to the full line position of Fig. 10, the ear 74 of the carrier or shuttle is against the upper stop screw 75 which limits the downward movement of the platform bars 73 to hold the latter in alignment with the forwarding conveyor F. Accordingly, the resilient link 78 is elongated or stretched, the portion 86 being withdrawn slightly from the sleeve 83 so that the washer 90 is moved toward the bearing 84 compressing the spring 87. Likewise, when the ear 74 of the carrier is against the lower stop screw 75, the platform bars 73 of the carrier or shuttle are held in alignment with the discharge end of the loading conveyor and the resilient link 78 is compressed or shortened during a portion of the travel of the crank pin 81. When the link is thus shortened, the portion 86 slides partly into the sleeve 83, the washer 89 being forced against the spring 87 to compress the latter, the washer 90 being held by an internal spacing sleeve 91. By thus providing stops for the shuttle or carrier in combination with a link which is resiliently expansible and contractible, a lost motion travel of the crank 80 is provided while the platform bars 73 are at the discharge station of the loading conveyor and while they are at the receiving station of the forwarding conveyor. Since the crank 80 rotates at an approximately uniform speed, the lost motion thereof creates a slight dwell of the carrier at the conveyor stations sufficient to permit movement of an article onto and off the platform bars 73. Furthermore, the resilient character of the link 78 provides a yielding movement of the carrier or shuttle, which reduces the danger of injury to the operator if his hand or arm should become caught between the carrier bar 73 and other parts of the mechanism, and also avoids injury and damage to the mechanism.

Figure 8:
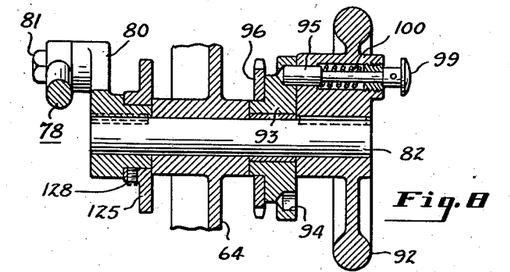
Fig. 8 is a sectional detail taken substantially on the line 8—8 of Fig. 5 and enlarged with respect thereto to show the mechanism for adjusting the relationship of the cyclic movement of the carrier or shuttle with respect to the flights of the forwarding conveyor.

On the outside of the supplemental frame 64, the short shaft 82 has keyed thereon a hand wheel 92 and between the hand wheel and the frame 64 is disposed a driven sprocket wheel 93, freely rotatable on the shaft 82 and having a plurality of circumferentially spaced axial sockets 94 that are adapted to receive a retractable pin 95 carried by the hand wheel 92. In this manner, the hand wheel 92 may be locked to the sprocket wheel 93 to rotate with the latter, the position of the hand wheel and the shaft 82 being rotatably adjustable with respect to the sprocket wheel 93 by interlocking the pin 95 with different sockets 94. Sprockets 96 of the sprocket wheel 93 is driven by a chain 97 trained around a sprocket 98 secured on the driven shaft 68, previously mentioned. The sprockets on the driven shaft 68 for actuating the chains or endless members 65 of the forwarding conveyor F and the drive chain 97 for the shuttle or carrier S are so proportioned that the shuttle makes one reciprocation or cyclic movement from the discharge station of the loading conveyor to the receiving station of the forwarding conveyor and back again during each movement of the forwarding conveyor F equal to the spacing between the successive flights thereof. Thus, for each movement of the carrier to transfer one loaf or article A from the loading conveyor to the forwarding conveyor, the flights of the latter move a single flight spacing distance so that one of the flights 69 is brought into position to advance each article delivered to the forwarding conveyor.

For the purpose of adjusting the apparatus to handle articles of different width it may be desirable to advance or retract the flights 69 to vary the position of each flight relative to the apron 70 of the forwarding conveyor at the time an article or a loaf is released to the forwarding conveyor at the receiving station of the latter by the shuttle or carrier. The hand wheel 92 affords a convenient device for adjusting the relationship between the movement of the shuttle or carrier and the flights 69 of the forwarding conveyor, since by retracting the pin 95 by means of a knob 99 and against the force of a compression spring 100 the shaft 82 may be rotated to raise or lower the position of the carrier bars 73 while the flights 69 are stationary and the pin 95 then reinserted in the appropriate socket 94.

The supplemental frame 64 includes an apron 101 extending between the side members of the frame above the path of the carrier bars 73. As shown in Fig. 6, the apron 101 is so disposed in an upright position as to engage the front side of an article or loaf A received on the carrier bars at the discharge station of the forwarding conveyor, thus constituting a stationary stop to limit the movement of each article received. While the shuttle is lowering a loaf to the forwarding conveyor the loaf slides downwardly over the apron 101 and disengages the latter when the rods 73 slope downwardly toward the forwarding conveyor.

Arms 102 are pivotally mounted on collar bolts 104 supported by the side members of the frame 64 in alignment with one another and below and parallel to the shaft 72 of the carrier. Between the outer ends of the arms 102 is supported a loaf intercepting plate or stop 103. This stop is thus mounted to turn on the bolts 104 from a loaf intercepting position, shown in Fig. 5, in which the plate extends above the plane of the article supporting surface of the loading conveyor to a depressed or retracted position, shown in Fig. 6, wherein the upper edge of the stop is withdrawn below the path of the articles so as to permit an article to move from the discharge end of the loading conveyor over the stop and onto the carrier bars 73. Extension portions 105 of the arms 102 have connection with helical tension springs 106, adjustably anchored or attached by fasteners 107 to the side member of the frame 64. Thus, the springs 106 normally turn or swing the arms 102 in a clockwise direction about the pivot bolts 104, as viewed in Fig. 5, to move the plate 103 upwardly to loaf intercepting position, the limit of movement being established by bumpers or lugs 108 formed or secured on the side members of the frame 64 to engage the extension portions 105 of the arms 102.

Adjacent one end of the carrier member 71 is secured a cam or pusher 109 having a curved surface which engages a roller 110 mounted on one of the arms 102 of the loaf stop during the upward turning or swinging movement of the carrier or shuttle S. The cam 109 is so formed that the roller 110 is engaged thereby just prior to engagement of the ear 74 by the bottom stop screw 75 which limits the upward movement of the shuttle or carrier. Hence, as the carrier approaches the discharge station of the loading conveyor L the loaf stop 103 is retracted from loaf intercepting position so that the leading or first loaf on the loading conveyor is released to move onto the carrier bars 73 and against the stationary apron 101 under the influence of the relatively high speed booster roller 50.

As previously mentioned, the lost motion of the crank 80 provided by the resilient link 78 effects a dwell of the carrier or shuttle at the discharge station of the loading conveyor, affording ample time for the movement of the article or loaf A completely onto the carrier bars from substantially the broken line position to the full line position, shown in Fig. 6. When the dwell period of the carrier or shuttle S at the discharge station terminates, the downward movement of the carrier bars 73 is accompanied by simultaneous upward movement of the loaf stop 103 under the influence of the spring or springs 106, the cam 109 being withdrawn from the roller 110. The relatively high speed of the booster roller 50 moves the leading loaf from the discharge station of the loading conveyor onto the carrier bars 73 more rapidly or at a higher rate of speed than the conveyor belt 38 advances the succeeding loaf or loaves, thus providing a separation or space between the leading loaf received by the carrier bars and the next succeeding loaf on the loading conveyor, into which space or opening the stop plate 103 is shifted or moved by the springs 106 as soon as the carrier bars 73 commence their downward movement.

The time interval during which the stop plate 103 is retracted for the movement of an article onto the carrier bars 73 is but a fractional part of the cycle of the shuttle or carrier S. During the remaining fraction or time interval of the cycle of the carrier or shuttle, the stop plate 103 engages the leading loaf or article at the discharge station of the loading conveyor, preventing further movement of the leading loaf and all the succeeding loaves except such as may occur to bring the succeeding loaves into side by side abutting engagement with one another.

For the purpose of stopping the conveyor belt 38 and the booster roller 51 during a portion of the time that the carrier bars 73 are withdrawn from the discharge station of the loading conveyor and the stop plate 103 is in loaf intercepting position, a switch is interposed in the circuit for the conveyor drive motor 40. This switch comprises contact screws 112 and 113 connected, respectively, to a wire 114 leading to a suitable source of power and to a wire 115 having connection with one side of the motor 40. The other side of the motor 40 is connected by a wire 116 to the power source. The contacts 112 and 113 may be threaded through a supporting block of insulating material 117, attached to the inside of one of the side members of the frame 64. A contact bar or element 118 of brass or similar material is carried on an arm 119 of insulating material pivotally adjacent the contacts on the inside of the side frame at 120. A helical compression spring 121, adjustable by a screw 122 supported at 123, normally acts on the arm 119 to hold the contact bar 118 in spanning and contacting relation across the contact screws 112 and 113, thereby effecting energization of the motor 40.

As shown in Fig. 5, the switch mechanism is mounted adjacent the short shaft 82 on the inside of the supplemental frame 64. A removable and replaceable cam segment or element 124 in a recessed peripheral portion of a rotatable cam member 125 on the hub of the crank 80 for rotation therewith is arranged to engage a cam follower or projection 126 on the insulated arm 119 to periodically move or pivot the arm 119, thereby withdrawing the contact plate or element 118 away from the contacts 112 and 113, thus deenergizing the motor 40 and stopping the belt 38 and the booster roller 50 of the loading conveyor. The rotatable cam member 125 is mounted to turn on the hub of the crank 80 and is provided with a locking or set screw 128 that engages the crank hub to hold the cam member in adjusted position. The cam member 125 is mounted for adjustment with respect to the crank 80 by means of the set screw 128 so that the driving motor 40 runs during that portion of the cycle in which the carrier bars 73 are away from the discharge station of the loading conveyor and the stop or loaf intercepting plate 103 is in raised position. Preferably, the cam 124 is so arranged that the loading conveyor motor 40 is deenergized as the carrier bars 73 are nearing their upper limit of travel and before the stop plate 103 has begun to move downward. Stopping the loading conveyor as described removes all loaf pressure on the stop plate due to the belt and prevents the loaf rolling tendency that would be caused by the stop plate 103 moving out of the path of a loaf pressed against it.

In connection with this feature of the present invention, it is important to note that the angle of downward inclination of the loading conveyor L is less than the "sliding angle"; that is, the angle at which loaves on the belt 38 move or slide thereover under the influence of gravity alone, toward the discharge end of the conveyor. The "sliding angle" is determined by the coefficient of friction of the belt 38, being less for a metal or wire mesh belt than for a canvas belt. Accordingly, although the movement of loaves over the loading conveyor may be to some extent helped by gravity, the inclination of such conveyor is insufficient to cause sliding of the loaves upon the belt. Hence, when movement of the belt 38 is arrested by the deenergization of the drive motor 40, the loaves on the belt likewise stop. The only loaf then transferred to the carrier bars is the one resting upon the booster roller 59 which begins to revolve upon re-energization of the motor 40 which occurs under the control of the switch or contact member 118 when the convex faced stop plate has removed itself from the path of the leading loaf. Since the following loaf is traveling at the relatively slow rate of the belt 38, the stop plate 103 can rise in the space made by the separation between the transferred loaf and the following loaf.

The circumferential length of the cam 124 determines the time interval during which the motor 40 is deenergized. As long as the cam follower 126 is in engagement with cam 124, the contact member 118 is held away from the contacts 112 and 113, thus preventing the flow of current to the motor. While, if desired, the cam segment 124 may be replaced by a segment of a length sufficient to cause the loading conveyor motor to remain idle for a longer time interval during each cycle of the apparatus, it has been found preferable in most instances to make the cam 124 relatively short, as shown, so that there is a substantial or prolonged period of operation of the conveyor belt 38. By interrupting the movement of the belt for only a very short period it is practicable to run the belt at a lower speed between the successive dwell periods than would otherwise be possible and the belt can also close up any spaces between loaves which the operator may have left when placing the loaves on the loading conveyor.

Articles A intermittently delivered to the forwarding conveyor F by the shuttle S are individually engaged by the flights 69 of the forwarding conveyor and advanced thereby into and through the moving cutters 4, the ends of the loaves or articles being in contact with and guided by the side members or rails 8. Sliced articles emerging from the cutters 4 pass over a supporting cross member 130 aligned with the ends of the guide fingers 16 and move thence onto the concave upper or supporting side of a curved apron 131 of the discharge conveyor D, the sliced loaves or articles passing under a pivoted hold-down 132 which engages the tops of the loaves to prevent toppling over of the articles and to hold the slices together.

Figure 12:
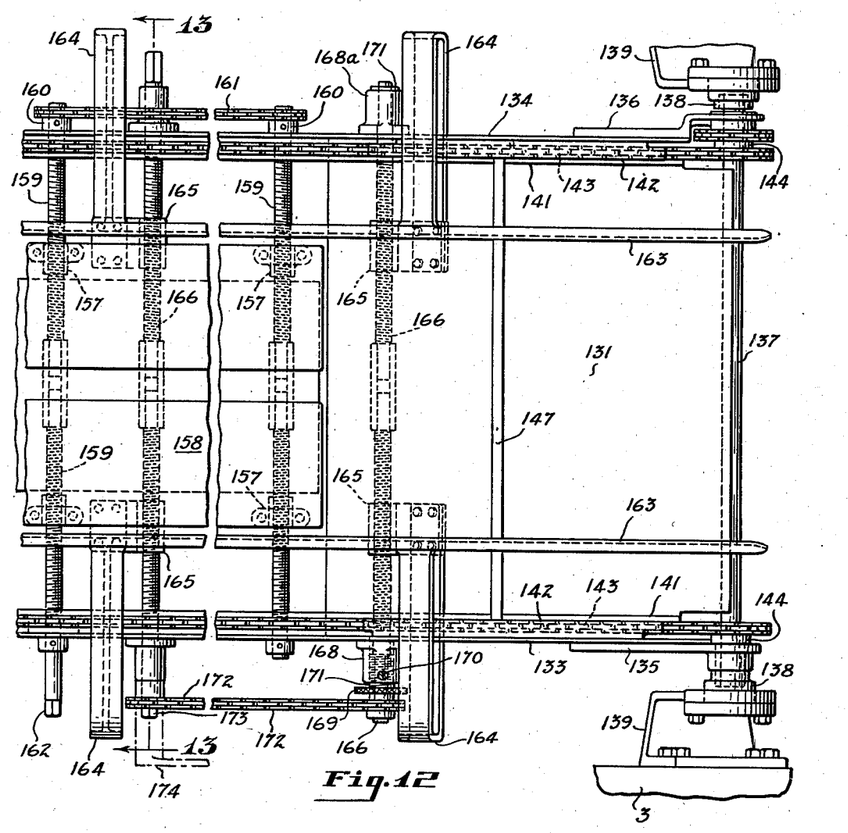
Fig. 12 is a foreshortened plan view, with parts removed and with parts broken away, showing the discharge conveyor of Fig. 1 on an enlarged scale with respect thereto.

The discharge conveyor D comprises spaced supporting side members 133 and 134 disposed in parallel relation to one another and having offset end portions or elements 135 and 136, respectively, which are carried by a driven shaft 137 journaled in bearings 138 received in suitable openings formed in stirrup-shaped brackets 139 mounted on the inside of the side frame members of the supporting structure 3. At an intermediate or central portion of the discharge conveyor D, the frame members 133 and 134 are supported on upright, adjustable height standards 140 or, if desired, the discharge conveyor D may be supported by a wrapping machine (not shown).

Endless side members or chains 143 that ride on supports or ledges 141 of the side members 133 and 134 are trained around sprockets 144 secured on the driven shaft 137 and disposed just inside the frame members 133 and 134. The chains or flexible members 143 are disposed in generally parallel relation to one another and along the concave apron 131 engage the underside of curved tracks or guides 142. At the remote end of the discharge conveyor the chains are trained around sprockets 145 mounted on shaft means carried by the side members 133 and 134. Idler sprockets 146 are also provided for the bottom laps of the endless side chains 143 beneath the curved apron 131. Between the side chains 143 at uniformly spaced intervals extend flights 147 which individually engage the rear sides of articles received on the apron 131 to advance such articles away from the cutters and along the apron means of the discharge conveyor.

All of the conveyors and the shuttle or carrier of the article handling apparatus described above are driven from a single rotatable shaft 149 disposed transversely across the machine and journaled in the side members of the supporting structure 3. This shaft may be driven by any suitable means, preferably, however, being actuated by an endless member such as a chain or a belt 148 trained over a sprocket or the like of the wrapping machine (not shown). By such an arrangement the conveyors L, F and D and the shuttle S may be actuated in timed relation to one another and to the cyclic operation of the wrapping machine to which the apparatus shown herein feeds the sliced articles. The main drive shaft 149 drives by means of and endless member or belt 151 a jack shaft 150, also journaled between the side members of the supporting structure 3. The jack shaft 150 has secured thereon sprockets or the like around which are trained endless flexible members 152 and 153, such as belts or chains, which drive respectively a shaft 154 journaled in the supplemental frame 64 and the driven shaft 137, previously mentioned, of the discharge conveyor D. Suitable idlers or rotatable members 155 for the endless belt or chain 152 are supported by one of the side members of the supporting structure 3. The shaft 154 is provided with sprocket means that drives an endless member or chain 156 for actuating the driven shaft 68, previously mentioned, of the forwarding conveyor F. The various sprockets and endless belts or chains for interconnecting the drives of the conveyors on the shuttle are so proportioned that for each movement of the endless chains 65 of the forwarding conveyor F corresponding to the spacing between successive flights 69, the endless chains 143 of the discharge conveyor D move a distance corresponding to the flight spacing distance between the flights 147. Thus, for each article or loaf advanced into and through the cutters by one of the flights 69, a sliced loaf is received by the discharge conveyor D and is individually engaged and advanced thereover by one of the flights 147.

Extending as a continuation of the curved or concave apron 131, the discharge conveyor D is an adjustable width apron means, indicated generally at 158, to support the articles being advanced over the discharge conveyor. The apron means 158 consists of plates or members in overlapped relation or slidable relative to one another, the arrangement being more fully disclosed in my copending application, Serial No. 356,169, filed September 10, 1940, now Patent No. 2,273,472, issued February 17, 1942. Briefly, the adjustable width apron means 158 includes side plates or aprons carried by rotatable screws 159 journaled in the side members 133 and 134 of the conveyor and having oppositely threaded ends for engaging threaded blocks 157 secured to aprons or plates of the apron means 158, whereby such side aprons or plates can be moved toward and away from one another. The rods 159 are joined to rotate in unison, as by means of sprockets 160 and an endless belt or chain 161 trained over said sprockets. One of the rods 159 is formed with a square end 162 for receiving a crank or a wheel to turn the rod.

Figure 13:
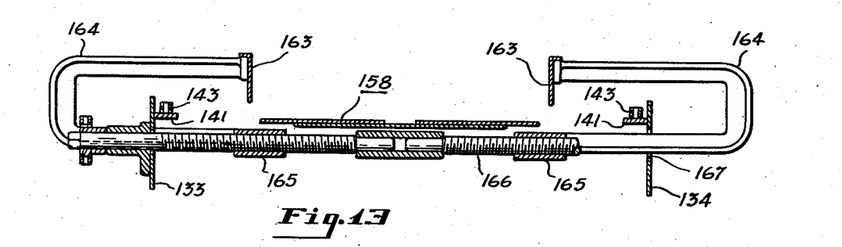
Fig. 13 is a sectional detail taken substantially on the line 13—13 of Fig. 12.

A pair of spaced guide rails 163 is supported above the concave apron 131 and the apron means 158 of the discharge conveyor D by U shaped support members 164 which straddle the upper runs of the endless belts or chains 143, as shown in Fig. 13. The ends of the U shaped supports 164 on opposite sides of the discharge conveyor are directed toward one another, the upper ends having connection with the guide rails 163 while the lower ends, which extend beneath the apron means 158 and the apron 131, have connection with threaded members 165 threadedly received on the oppositely threaded ends of screws 166 journaled in the frame members 133 and 134. The threaded members 165 are so formed that the U shaped supports 164 are offset from the axis of the rods 165 whereby the U shaped supports 164 may be disposed for movement through suitable openings 167 formed in the frame members 133 and 134 of the discharge conveyor and spaced from the journals for the rods 166. One of the rods 166 is carried in sleevelike journals 171, one of which is threaded in and may be shifted axially in a tubular journal support 168 carried by the side frame member 133, the other sleevelike journal being rigidly clamped in a suitable support 168a secured to the frame member 134 and slidingly receiving the rod 166 for axial or endwise movement therein. The movable journal 171 is formed with a knurled flange 169, the rotation of which effects longitudinal or axial shifting movement of the journal and the shaft 166. Locking screw or bolt 170 in the journal support 168 is provided to engage the movable journal 171 and to lock the journal in adjusted position. By this arrangement, of shifting the journals for one of the rods 166, the ends of the guides 163 adjacent the cutters 4 may be simultaneously moved laterally in the same direction while maintaining a substantially constant spacing between the guide rails. The rods 166 are connected for synchronous rotation by means of an endless belt or chain 172 trained over sprockets secured on the rods outside of the frame 133, one of the rods being provided with a squared end 173 to receive a crank 174 to rotate the rod. When the rods 166 are rotated in one direction the threaded members 165 are drawn together, thereby carrying the guide rails 163 toward one another. When rotated in reverse direction the rods 166 spread the threaded members 165 beneath the apron of the conveyor and thereby separate the guide rails 163 to adjust the desirable conveyor for loaves of increased length, it being understood that loaves are advanced sideways over the conveyor with the loaf ends engaged by the guide rails 163. By the use of the U shaped supports 164, the adjusting rods 166 can be much shorter than required for conventional designs of similar conveyors. Hence, the machine, when the guide rails 163 are drawn to their narrowest spacing, is much narrower and more compact than machines of earlier design.

Figures 14, 15, 16:
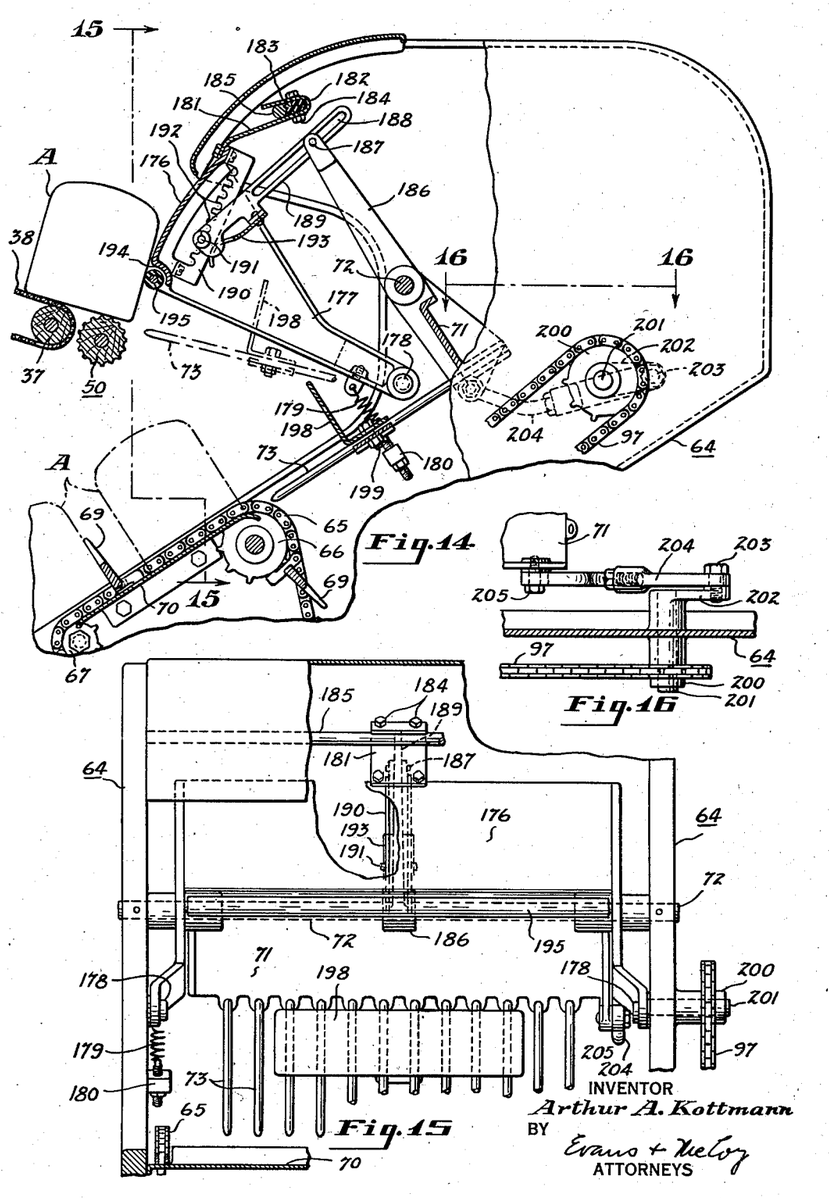
Fig. 14 is a fragmentary side elevational view, partly in section and with parts removed, illustrating a modification of the invention and corresponding to Fig. 5.
Fig. 15 is a transverse elevational view, partly in section and with parts broken away, further illustrating the modification of Fig. 14 and taken substantially on the line indicated at 15—15 of that figure.
Fig. 16 is a sectional detail taken substantially on the line 16—16 of Fig. 14.

In Figs. 14 through 16 is illustrated a modification of the invention in which the loaf intercepting plate 103, previously described, and which has a loaf engaging surface the upper portion of which is convex and the lower portion of which is concave, is replaced by a convex stop 176 disposed transversely across the discharge end of the loading conveyor L and supported between the ends of arms 177, which are mounted for turning movement on pivots 178 secured to the side members of the supplemental frame 64. The stop 176 having its convex face disposed to engage the leading loaf on the loading conveyor is normally drawn yieldingly downwardly by helical tension springs 179 connected to the spaced arms 177 and to bosses or fasteners 180 formed on or secured to the inside of the supplemental frame members. A strip of spring metal 181 is secured to the central portion of the stop 176 and extends upwardly therefrom, having a reverse bend at 182 in which is received a resilient bumper 183 of rubber or the like held by bolts 184 and engageable with a transverse rod 185 mounted between the side members of the supplemental frame 64. The rod 185 is straddled by the hooklike end of the strip 181, thereby limiting the downward movement of the stop 176 to approximately the full line position shown in Fig. 14.

To raise the stop 176 so that the leading loaf on the discharge conveyor can move onto the carrier bars 73, the member 71 of the carrier or shuttle is formed with an extension arm 186 which moves through an arc during the oscillation of the carrier and is provided with a pin 187 received in an elongated slot 188 of a link 189 having connection with the stop 176. While the link 189 may have a fixed pivotal connection with the stop 176, it is preferred to provide for adjustment of the apparatus so that the stop 176 may be raised to different heights by the arm 186, depending upon the height of the articles being handled.

One form of adjustable pivotal connection comprises spaced parallel bars 190 secured to the center of the rear side of the stop 176 and disposed on opposite sides of the lower end of the link 189. A short bar or pivot pin 191 carried by the lower end of the link 189 is receivable in any one of a number of aligned notches or slots 192 formed in the bars 190, the pins being held in the desired notch by a leaf spring 193 secured to the link 189 and bearing against the back edges of the bars 190.

During lowering of the carrier or shuttle S from the discharge station of the loading conveyor, the stop 176 is lowered under the influence of gravity and the springs 179, the extension arm 186 of the carrier member 71 moving in a counterclockwise direction, as viewed in Fig. 14, with the pin 187 disposed at the upper or extreme end of the link 189. After the stop 176 is lowered to its bottommost position, as determined by engagement of the rod 185 by the rubber bumper 183, the continued pivotal movement of the extension arm 186 causes the pin 187 to ride downwardly in the elongated slot 188 of the link 189. Thereafter and when the carrier bars 73 start their upward movement to the discharge station of the loading conveyor to receive the next succeeding loaf, the pin 187 rides upwardly in the slot 188 to the end thereof, after which continued upward or clockwise movement of the extension arm 186 raises the stop 176 so that the next succeeding loaf or article on the loading conveyor may be moved onto the carrier bars 73 by the rapidly rotating booster roller 50 and under the influence of pressure of succeeding articles. Desirably, the lower corner of the stop 176 is recessed as indicated at 194 to receive an elongated roller 195 which rides over the side of the leading loaf on the loading conveyor, thereby avoiding abrasion of the loaf and tilting of the loaf on the conveyor.

To limit the movement of the loaf on the carrier bars or fingers 73, an upright stop 198 is secured to the fingers as by a bolt 199 which passes through a suitable plate member under the bars. The stop 198 may be moved back and forth on the carrier bars 73 to adjust the shuttle for articles of different width and locked in place by the bolt 199.

For driving the shuttle illustrated in Figs. 14 through 16, the drive chain 97, previously mentioned, is trained over a sprocket 200 secured on a stub shaft 201 corresponding to the shaft 82 previously described and journaled in one of the side members of the supplemental frame 64. A crank 202, corresponding to the crank 80 previously mentioned, is secured on the shaft 201 inside the frame and is connected by a pin 203 to an adjustable length link 204 which has pivotal connection by a pin 205 to the reciprocable or oscillatable member 71 of the carrier. The stub shaft 201 is rotated constantly and uniformly by the chain 97 and the throw of the crank 202 reciprocates the shuttle member 71 back and forth on the pivot shaft 72.

The operation of the shuttle or carrier device and the stop therefor, shown in Figs. 14 through 16, is essentially like that of the embodiment illustrated in Figs. 1 through 13. It is to be noted, however, that in the embodiment of Figs. 14 through 16, the stop moves downwardly to loaf intercepting position and is withdrawn upwardly; whereas, in the embodiment first described, the stop moves upwardly to loaf intercepting position and is retracted downwardly. The roller 195 is so arranged with respect to the convex or curved face of the stop 176 that during the movement of the stop only the roller makes any appreciable contact with the loaf or article.

Figure 17:
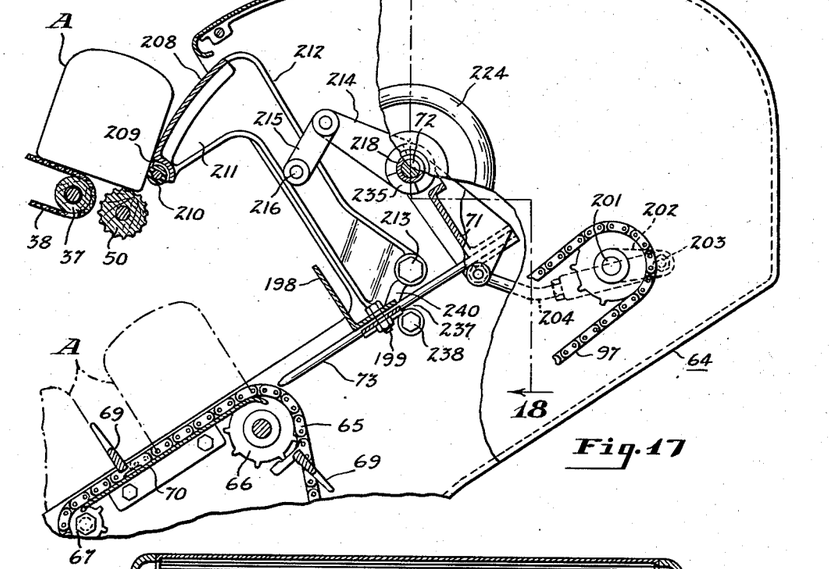
Fig. 17 is a fragmentary side elevational view, partly in section and with parts removed, illustrating a still further modification of the invention and corresponding to Figs. 5 and 14.
Figure 18:
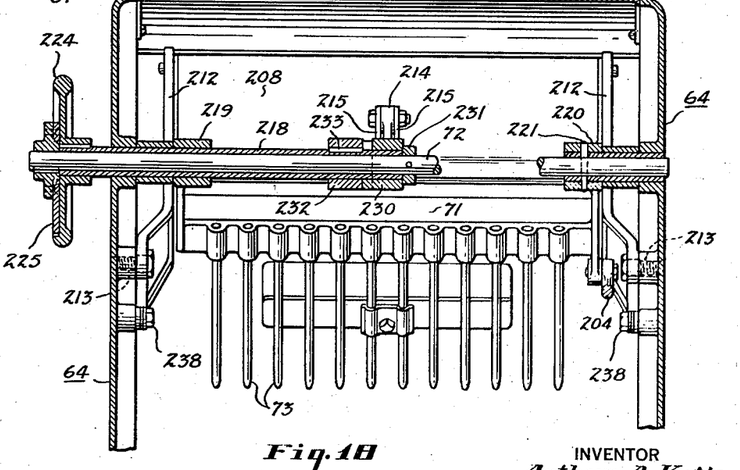
Fig. 18 is a transverse vertical sectional view with parts removed taken substantially on the line 18—18 of Fig. 17.
Figure 19:
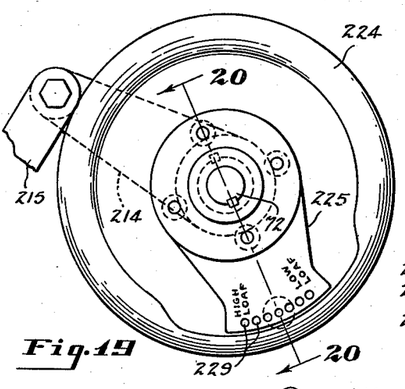
Fig. 19 is an elevational detail view of the adjusting mechanism used in the modification of Figs. 17-18 for altering the position of the loaf or article stop to accommodate articles of different heights.

In Figs. 17 through 24 is illustrated a further modification of the invention which somewhat resembles that shown in Figs. 14 through 16, and has corresponding parts indicated by the same numerals of reference. In this further modification of the invention, a loaf intercepting stop 208 is curved to present an outwardly convex face to the leading loaf on the discharge end of the loading conveyor and at its lower leading edge the stop is recessed at 209 to receive an elongated roller 210 corresponding to the roller 195, previously mentioned. The stop 208 is carried between the downwardly depending ends 211 of spaced generally parallel L shaped arms 212 pivoted on bolts 213 secured in the side members of the supplemental frame 64. The raising and lowering of the stop 208 is effected by means of an arm 214 mounted to turn on a sleeve or quill 218 embracing the transverse shaft 72 on which the carrier member 71 is suspended. As shown in Fig. 18, the carrier member 71 has hub portions, one of which, indicated at 219, is loosely mounted on the sleeve 218 and the other of which, indicated at 220, is keyed or pinned at 221 to the shaft 72 so as to oscillate or turn the shaft with the carrier as the latter is reciprocated by the crank 202. The end of the arm 214 is received between and pivotally connected to links 215 pivotally connected to a transverse bar or rod 216 extending between midportions of the L shaped arms 212.

To vary or alter the upper limit of movement of the stop 208, and to provide for a dwell of the stop across the end of the loading conveyor, the connection of the arm 214 to the oscillating or reversely turning shaft 72 includes an adjustable lost motion device which performs the function of the lost motion afforded by the elongated slot 188 in the link 189, previously described. The quill 218 extends through one side member of the supplemental frame 64, being journaled for turning movement therein and relative to the shaft 72. On the outside of the supplemental frame the quill 218 has a hand wheel 224 keyed thereon so that the rotative position of the quill may be altered by the operator upon turning the hand wheel. The shaft 72, which extends through the hand wheel and beyond the end of the quill 218 outside of the supplemental frame, has an arm 225 keyed or otherwise secured thereon so that the arm turns or swings with the shaft 72.

Figure 20:
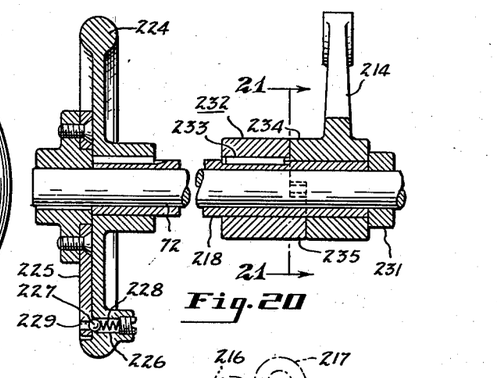
Fig. 20 is a foreshortened sectional detail taken substantially on the line 20—20 of Fig. 19.
Figure 21:
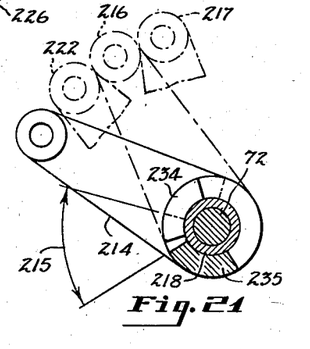
Fig. 21 is a sectional detail taken substantially on the line 21—21 of Fig. 20 to show the shaft connections for the lost motion mechanism that operates the loaf or article stop.
Figure 22:
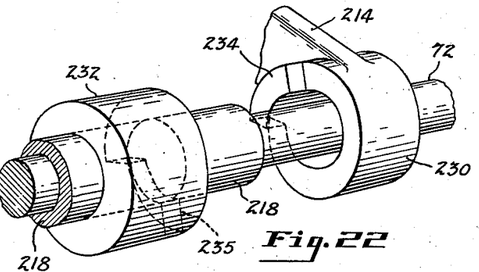
Fig. 22 is a perspective detail, somewhat diagrammatic, showing certain of the parts of Figs. 20 and 21 separated from one another.
Figure 23:
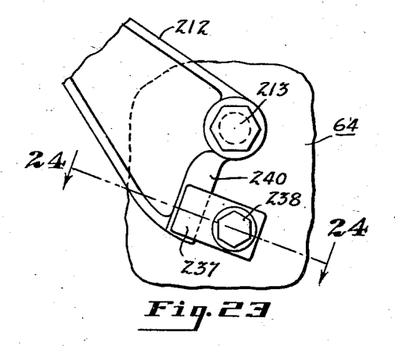
Fig. 23 is an elevational detail showing the brake or shock absorber for limiting the downward movement of the loaf or article stop.

Adjacent the periphery of the hand wheel 224 is a recess 226 which receives a steel ball 227 and a helical compression spring 228 which presses the ball against the inside surface of the arm 225 adjacent the end of the latter. Preferably, a number of apertures or recesses 229 are formed in the arm 225 to engage the steel ball 227, thus constituting a detent arrangement for holding the arm 225 in fixed position relative to the hand wheel 224 for normal operating conditions. The detent ball 227 normally constrains the sleeve 218 to turn or oscillate in unison with the shaft 72, although under severe forces the ball will ride out of the recesses to avoid injury to the mechanism. Hub 230 of the actuating arm 214 is mounted to turn on the sleeve or quill 218 and is constrained against axial movement by a collar 231 secured on the shaft 72 and an actuating collar 232 keyed at 233 to the quill 218. The hub 230 is formed with a segmental axial extension or boss 234 which engages one end of the actuating collar 232, as shown in Fig. 20, while the collar 232 is formed with an axial extension or boss 235 which engages the end of the hub 230.

Each of the extensions or bosses 234 and 235 is of relatively short circumferential extent, so that while the bosses or extensions provide an interlocking connection between the actuating sleeve 232 and the hub 230 of the arm 214, such connection permits a limited amount of lost motion. The shaft 72 which turns the actuating collar 232 through the arm 225 and the hand wheel 224 may turn the boss 235 through an angle such as indicated by arc 215, Fig. 21, while the arm 214 may be moved by engagement between the bosses 234 and 235 through a lesser arc from its lowermost position shown in full lines in Fig. 21 to the broken line position indicated at 216. Thus the shaft 72 and the quill 218 move an appreciable amount during the raising and lowering of the carrier bars 73, while the arm 214 remains in the full line position shown with the stop in loaf intercepting position. Turning the hand wheel 224 relative to the arm 225 so as to move the ball detent 227 into a different recess or socket 229 changes the relative position of the boss 235 of the actuating collar 232 with respect to the shaft 72. Moving the hand wheel 224 clockwise, as viewed in Fig. 19, relative to the arm 225, adjusts the actuating collar 232 so that the lost motion connection between the lug 235 and the lug 234 of the arm 214 is diminished, and as the carrier bars 73 are raised the loaf stop 208 is elevated to a higher position so that higher or taller loaves or articles can be handled by the shuttle. See the corresponding position of the arm 214 indicated at 217, Fig. 21. Conversely, moving the hand wheel 224 counterclockwise, as viewed in Fig. 19, lowers the height to which the stop 208 is elevated when a loaf is to be received by a carrier bar 73. If desired, the arm 225 may be inscribed, as shown, to indicate the detent recesses 229 which should receive the ball detent 227 for different loaf heights. The position of the arm 214 corresponding to a lowering of the height to which the stop 208 is elevated is indicated by the broken lines 222, Fig. 21.

Figure 24:
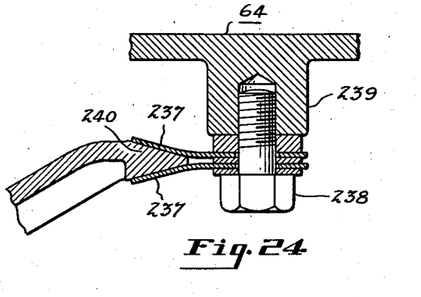
Fig. 24 is a sectional detail taken substantially on the line 24—24 of Fig. 23 and enlarged with respect thereto.

The lower limit of movement of the loaf stop 208 is determined by a stop or brake, shown to advantage in Fig. 24, which comprises a pair of resilient metal strips 237, such as spring steel or brass, which are secured by a bolt 238 to a boss 239 on the inside of one of the side members of the supplemental frame 64. The free ends of the spring strips 237 are disposed in divergent relation and receive therebetween a wedge-shaped extension 240 formed on one of the pivoted arms 212 that carry the stop 208. As the loaf stop moves to article intercepting position, shown in Fig. 17, the wedge extension 240 is received between the spring members 237 that resiliently brake the downward movement of the loaf stop and associated parts. Thereafter, upon continued downward movement of the carrier bars 73 after the article stop 208 has been arrested in loaf intercepting position by the brake or stop 237, the extensions or bosses 234 and 235 move away from one another through the lost motion which occurs while the carrier bars 73 move to the receiving end of the forwarding conveyor F to release the article and return toward the discharge station of the loading conveyor. As the carrier bars 73 approach the discharge station of the loading conveyor, the bosses or extensions 234 and 235 of the lost motion device again come together to effect a driving connection between the shaft 72 and the arm 214, raising the loaf intercepting stop 208 and withdrawing the extension 240 from between the spring strips 237.

The article handling apparatus of the present invention thus includes a plurality of conveyors drivingly connected together so as to be actuated from a common rotatable member, and to operate in timed relationship to one another for handling articles, such as bread loaves, in succession. A reciprocable or oscillating shuttle is provided which takes loaves or articles one by one from a discharge end of a downwardly inclined loading conveyor and delivers the articles one by one onto the receiving end of a downwardly inclined forwarding conveyor having flights to individually engage the rear sides of received articles and to advance the articles to and through the cutters. The shuttle can be adjusted in its cyclic position relative to the positions of the flights on the forwarding conveyor so that the apparatus can be regulated to efficiently handle articles of different sizes. Furthermore, the loaf intercepting stops, such as shown in Figs. 14 through 24, which are withdrawn upwardly from the leading loaf on the discharge conveyor include means for regulating the height to which they are withdrawn for the purpose of adjusting the mechanism to articles of different height.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim is:

1. In apparatus for handling bread loaves and the like, an upper conveyor, a lower conveyor having spaced flights for individually engaging and advancing loaves deposited thereon, a carrier and means mounting the same for reciprocation between the conveyors, the end of the carrier nearest the upper conveyor being removable from a position to receive loaves from the upper conveyor downwardly to a position to deposit the loaves intermittently on the lower conveyor between the flights of the latter, means for actuating the carrier and the flights of the lower conveyor in unison, and means mounted independently of the carrier and movable in timed relation to the carrier from a position below the loaf supporting surface of the upper conveyor to a position for engaging the endmost loaf on the upper conveyor to prevent said endmost loaf from moving off the end of the upper conveyor while the carrier is moving downwardly to deposit a loaf on the lower conveyor.

2. In bread handling apparatus, a downwardly inclined upper conveyor, a downwardly inclined lower conveyor having a top receiving end spaced from the bottom discharging end of the upper conveyor, a carrier having a generally planar loaf receiving and supporting means, and means mounting the carrier for reciprocation between the conveyor ends, said mounting means being operative to shift the supporting means during reciprocation of the carrier from a position of general alignment with the upper conveyor to receive a loaf therefrom to a position of general alignment with the lower conveyor to deliver a leaf to the latter, a stop member movable to an intercepting position across the discharging end of the upper conveyor to prevent loaves moving off the latter while the carrier is at the receiving end of the lower conveyor, yieldable means for normally holding said stop member in an intercepting position, and means operated by the carrier during its return to loaf receiving position for shifting said stop member out of intercepting position.

3. In bread handling apparatus, a downwardly inclined upper conveyor, a downwardly inclined lower conveyor having spaced flights for advancing loaves and a top receiving end spaced from the bottom discharging end of the upper conveyor, a carrier having a generally planar loaf receiving and supporting means, and means mounting the carrier for reciprocation between the conveyor ends in timed relation to the movement of said flights, said mounting means being operative to shift the supporting means during reciprocation of the carrier from a position of general alignment with the upper conveyor to receive a loaf therefrom to a position of general alignment with the lower conveyor to deliver a loaf to the latter, and means movable from a position below the loaf supporting surface of the upper conveyor to a position across the discharging end of the upper conveyor upon downward movement of the carrier to prevent loaves moving off the latter while the carrier is at the receiving end of the lower conveyor.

4. In bread loaf handling apparatus having spaced conveyors, a carrier and means mounting the same to turn about a horizontal axis for movement between the conveyors, a stop and means mounting the same independently of the carrier for movement pivotally about a second axis to and from loaf intercepting position at an end of one of the conveyors, and means interconnecting the carrier and the stop whereby movement of the carrier to said one conveyor is accompanied by movement of the stop from intercepting position and movement of the carrier from said one conveyor is accompanied by movement of the stop to intercepting position.

5. In bread loaf handling apparatus, a downwardly inclined loading conveyor having a discharging end, a downwardly inclined forwarding conveyor disposed beneath the loading conveyor and having an upper receiving end spaced vertically beneath said discharging end, a carrier for transferring loaves intermittently from the loading conveyor to the forwarding conveyor comprising a member mounted to turn about an axis paralleling the loaf supporting planes of the conveyors, means carried by said member to turn therewith for receiving a loaf from said discharging end and lowering a received loaf to the receiving end, stop means mounted independently of the carrier and movable about an axis parallel to the first-mentioned axis and across said discharging end to engage and arrest the movement of loaves on the loading conveyor, and drive means including connections for synchronously actuating the carrier and the stop means to withdraw the stop means from the discharging end of the loading conveyor while the loaf receiving means is in position to receive a loaf therefrom.

6. In a slicing machine, a supporting structure, movable cutters mounted in an inclined position on the structure and means for actuating the same, a conveyor supported on the structure for forwarding articles to the cutters and having its delivery end spaced from the cutters, guides through which the articles are advanced in contacting relation by the forwarding conveyor to the cutters a loading conveyor above the cutters and said forwarding conveyor and so disposed that the normal direction of movement of articles on the loading conveyor is opposite to the normal direction of movement of articles on the forwarding conveyor, said loading conveyor having a discharge end adjacent the receiving end of the forwarding conveyor, and being connected at its opposite end to an upper portion of the supporting structure and supported thereby in cantilever fashion, means for driving said conveyors, and means for intermittently transferring articles from the loading conveyor to the forwarding conveyor.

7. In a slicing machine, a supporting structure, movable cutters mounted in an inclined position on the structure and means for actuating the same, a conveyor supported on the structure for forwarding articles to the cutters and having a receiving end spaced from the cutters, a loading conveyor above the cutters and said forwarding conveyor and so disposed that the normal direction of movement of articles on the loading conveyor is opposite to the normal direction of movement of articles on the forwarding conveyor, said loading conveyor having a discharge end adjacent the receiving end of the forwarding conveyor, and being connected at its opposite end to an upper portion of the supporting structure and supported thereby in cantilever fashion, means for driving said conveyors, and means for transferring articles from the loading conveyor to the forwarding conveyor, said connection including means adjustable for raising and lowering the loading conveyor to vary the distance between the discharge end thereof and the receiving end of the forwarding conveyor.

8. In apparatus of the character described, a supporting structure, movable cutters mounted in inclined position on the structure and means for actuating the same, a conveyor including frame means supported on a lower portion of the structure for forwarding articles to the cutters and having a receiving end remote from the cutters, a loading conveyor connected at one end only to an upper portion of the structure and supported thereby as a cantilever above the cutters and said forwarding conveyor, said loading conveyor being so disposed above the forwarding conveyor that the normal direction of movement of articles on the loading conveyor is generally opposite to the normal direction of movement of articles on the forwarding conveyor, and having a discharge end adjacent the receiving end of the forwarding conveyor, means for driving said conveyors, a carrier pivoted on the frame means for reciprocation between the discharging and receiving ends of the conveyors, a stop member mounted on the frame means independently of the carrier for movement across said discharge end to engage the endmost article on the forwarding conveyor to prevent such article from moving over the discharge end while the carrier is at the receiving end of the forwarding conveyor, and means for actuating said carrier and stop member.

9. In apparatus of the character described, a supporting structure, movable cutters mounted in inclined position on the structure and means for actuating the same, a conveyor including frame means supported on a lower portion of the structure for forwarding articles to the cutters and having a receiving end remote from the cutters, a loading conveyor connected at one end only to an upper portion of the structure and supported thereby as a cantilever above said cutters and said forwarding conveyor, said loading conveyor being so disposed above the forwarding conveyor that the normal direction of movement of articles on the loading conveyor is downwardly at least in part gravitational and generally opposite to the normal direction of movement of articles on the forwarding conveyor, the other end of said loading conveyor constituting a discharge adjacent the receiving end of the forwarding conveyor but spaced above the same, a carrier pivoted on the frame means for reciprocation between said discharge and the receiving ends of the conveyors, and means for adjusting the connection of the loading conveyor to the structure for raising and lowering the discharge end only thereof to thereby alter the downward inclination of the loading conveyor and the space between the discharge and receiving ends of the conveyors.

10. In bread loaf handling apparatus having spaced conveyors, a carrier and means mounting the same to turn about a horizontal axis for movement between the conveyors, a stop and means mounting the same for movement to and from loaf intercepting position at an end of one of the conveyors, resilient means normally holding the stop in intercepting position, and means operative upon movement of the carrier to said one conveyor to move the stop from said intercepting position whereby a loaf at said conveyor end is released for movement onto the carrier.

11. In bread loaf handling apparatus, carrier means for transferring loaves from one conveyor to another, said carrier comprising a member mounted to turn about a substantially horizontal axis, loaf supporting means secured to said member to turn therewith, a continuously rotating crank, a rod connecting the crank and said member, said rod including resilient means providing limited longitudinal expansion and contraction thereof, and means limiting the turning movement of said member to expand and contract the rod and provide for lost motion travel of the crank whereby the loaf supporting means of the carrier dwells at the limit of movement of the member.

12. In bread loaf handling apparatus, an endless belt loading conveyor and an electric drive motor therefor, a forwarding conveyor, a carrier and means mounting the same for reciprocation between the conveyors to receive loaves from the discharge end of the loading conveyor and to deliver the received loaves to the forwarding conveyor, constantly rotating means having connection with the carrier to move the latter through one cycle for each revolution of such means, electric switch means governing the energization of said motor, and means operatively associated with said constantly rotating means to actuate said switch means for interrupting said energization during each revolution of the rotating means.

13. In apparatus for handling bread loaves and the like, an upper conveyor, a lower conveyor having spaced flights for individually engaging and advancing loaves deposited thereon, a carrier having its receiving end movable from a position adjacent the discharge end of the upper conveyor for receiving a loaf from the discharge end of the upper conveyor downwardly to a position for discharging a loaf over said receiving end in an opposite direction upon the lower conveyor and then movable back to loaf receiving position, means for driving the lower conveyor, means for actuating said carrier in timed relation to the movement of the lower conveyor to transfer loaves intermittently from the upper conveyor to the spaces between the flights of the lower conveyor, a stop member movable to and from an intercepting position in the path of a loaf at the discharge end of the upper conveyor, and means operating during the downward and return movements of said carrier for moving said stop member relative to the carrier and to and from its intercepting position.

14. In apparatus for handling bread loaves and the like, an upper conveyor, a lower conveyor having spaced flights for individually engaging and advancing loaves deposited thereon, a carrier mounted for movement from a position for receiving a loaf from the discharge end of the upper conveyor downwardly to a position for discharging a loaf upon the lower conveyor and back to loaf receiving position, means for driving the lower conveyor, means for actuating said carrier in timed relation to the movement of the lower conveyor to transfer loaves intermittently from the upper conveyor to the spaces between the flights of the lower conveyor, a stop member movable to and from an intercepting position in the path of a loaf at the discharge end of the upper conveyor, a spring for actuating said stop member one direction, and means operated by the carrier during its movement in one direction for moving said stop member in opposition to said spring.

15. In a slicing machine, a supporting structure, a series of elongated endwise movable cutters mounted side by side in an inclined position in said structure, means for actuating the cutters, a downwardly inclined article runway for delivering articles to the cutters, an endless conveyor having flights which travel toward the cutters in a portion of the runway spaced from the cutters, a loading conveyor overlying the cutters having its discharge end above the flight conveyor, means for continuously driving said flight conveyor, means for intermittently driving said loading conveyor, and a vertically movable carrier for transferring articles from said loading conveyor to the flight conveyor, and a mechanism geared to said flight conveyor and having means for reciprocating said carrier in timed relation to the movement of the flight conveyor to deposit the articles between the flights of said flight conveyor.

16. A bread slicing machine comprising a supporting structure having an upwardly inclined top portion, a drum journaled in said inclined portion of the structure adjacent the upper end thereof, a second drum parallel to the first journaled drum near the opposite end of the supporting structure adjacent the bottom thereof, a series of endless cutter bands running over said drums and crossing midway between the drums, means for driving the drums, a supplemental frame mounted on said inclined portion of the structure below the central portion thereof, said supplemental frame having an inclination opposite that of the top portion of the supporting structure, a loading conveyor overlying the top of the supporting structure, said loading conveyor being supported at its receiving end upon the inclined top portion of the supporting structure adjacent its upper end and having its discharge end spaced from said supplemental frame sufficiently to permit discharge of loaves from the loading conveyor, means for forwarding loaves of bread to the cutter bands including a flight conveyor on said supplemental frame, and means for intermittently transferring loaves of bread from said loading conveyor to the spaces between the flights of said flight conveyor.

17. A bread slicing machine comprising a supporting structure having an upwardly inclined top portion, a drum journaled in said inclined portion of the structure adjacent the upper end thereof, a second drum parallel to the first journaled drum near the opposite end of the supporting structure adjacent the bottom thereof, a series of endless cutter bands running over said drums and crossing midway between the drums, means for driving the drums, a supplemental frame mounted on said inclined portion of the structure below the central portion thereof, said supplemental frame having an inclination opposite that of the top portion of the supporting structure, downwardly inclined guides through which loaves may be continuously fed to the crossing portions of said cutter blades, means for forwarding loaves through the guides to the cutter bands comprising a flight conveyor carried by the supplemental frame, means for continuously driving said flight conveyor, an endless belt loading conveyor overlying the inclined top portion of the supporting structure with its receiving end adjacent the upper end of said inclined portion and its discharge end spaced from said supplemental frame, and means for intermittently transferring loaves one at a time from the loading conveyor to the spaces between the flights of the forwarding conveyor.

ARTHUR A. KOTTMANN.